United States Patent Office.

JOHN BOLINDER, OF BROOKLYN, NEW YORK.

Letters Patent No. 104,104, dated June 14, 1870.

IMPROVEMENT IN SOFT SOAP OR WASHING-FLUID.

The Schedule referred to in these Letters Patent and making part of the same

*To all whom it may concern:*

Be it known that I, JOHN BOLINDER, of Brooklyn, in the county of Kings and State of New York, have invented a new and useful Improvement in Washing-Fluid; and I do hereby declare that the following is a full, clear, and exact description thereof, which will enable others skilled in the art to make and use the same.

My invention has for its object to furnish an improved washing-fluid or soft soap, which will readily and thoroughly remove dirt and grease, will bleach the clothes, and will not injure the fabric; and It consists of the washing-fluid prepared of the ingredients and in the proportions and manner hereinafter more fully described.

In preparing this washing-fluid, I dissolve one hundred and sixty-four (164) pounds of potash in two thousand one hundred and thirty-two (2,132) pounds of water, and, while boiling, one hundred and twenty-nine (129) pounds of lime, mixed with water to about the consistency of gruel, are gradually stirred in.

The clear solution is carefully strained from the lime deposited upon the bottom of the tank, and is divided into two equal parts, which I will designate as part 1 and part 2.

Part 1 is set aside and carefully protected from the air, and part 2 is boiled down to one-half its volume.

Part 1 is then heated to the boiling-point, and, while boiling, three hundred (300) pounds of vegetable oil and three hundred (300) pounds of whale-oil are mixed with it.

Part 2 is then added, gradually, and the whole boiled down to a thick paste.

Water and soda are then added to the paste, in the proportion of three (3) pounds of water and (2) pounds of soda to two (2) pounds of the paste, and the mixture is again boiled.

After cooling, six (6) pounds of ammonia, one (1) pound of oil of lavender, and one (1) pound of super-oxide of barium, are added.

When this fluid or soap is poured into warm water, the super-oxide is decomposed, and produces oxide of barium, which is soluble, and ozone, which bleaches the clothes without injuring them.

Having thus described my invention,

I claim as new and desire to secure by Letters Patent—

An improved washing-fluid or soft soap, formed of the ingredients and in the proportion and manner substantially as herein shown and described.

The above specification of my invention signed by me this 10th day of May, 1870.

JOH. BOLINDER.

Witnesses:
GEO. W. MABEE,
JAMES T. GRAHAM.